UNITED STATES PATENT OFFICE 2,590,085

HYDROXY XENOYL ALKANOIC ACIDS AND DERIVATIVES THEREOF

Robert R. Burtner, Skokie, and Harry A. Arbit, Chicago, Ill., assignors to G. D. Searle & Co., Skokie, Ill., a corporation of Illinois No Drawing. Application January 19, 1948, Serial No. 3,166

10 Claims. (Cl. 260—520)

This invention relates to hydroxyxenoylalkanoic acids, and to the preparation of the same. In particular it relates to acids having the general structural formula:

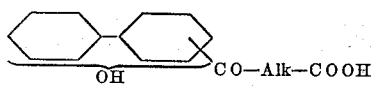

wherein Alk represents an alkylene radical and wherein the OH substituent may be located in either benzenoid ring.

In the foregoing structural formula Alk represents bivalent radicals derived from saturated aliphatic hydrocarbons and includes straight and branched chains of 2 to 8 carbon atoms. Among such groups are the ethylene, propylene, trimethylene, 1,2-butylene, 2,3-butylene, 1,3-butylene, amylene and related higher radicals. The ketoalkanoic acid side chain may be attached to the benzenoid ring in the ortho, meta or para positions to the biphenyl linkage.

Our invention is further disclosed by the following compounds which are representative of those within its scope.

A. β-(4-hydroxy-4'-xenoyl)propionic acid, having the formula:

B. δ-(4-hydroxy-4'-xenoyl)valeric acid, having the formula:

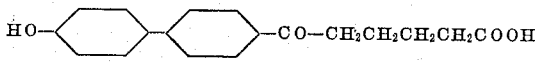

C. β-(4-hydroxy-3-xenoyl)propionic acid, having the formula:

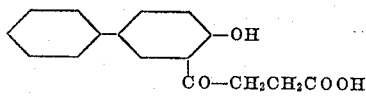

D. γ-(2-hydroxy-3-xenoyl)isobutyric acid, having the formula:

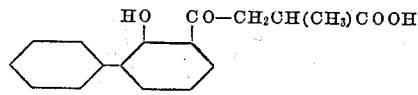

E. γ-(2-hydroxy-3-xenoyl)butyric acid, having the formula:

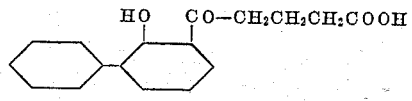

F. β-(2-hydroxy-5-xenoyl)propionic acid, having the formula:

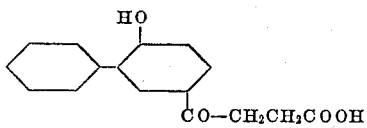

G. β-(3-hydroxy-4-xenoyl)propionic acid, having the formula:

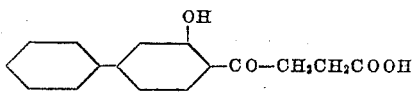

H. ω-(2-hydroxy-5-xenoyl)pelargonic acid, having the formula.

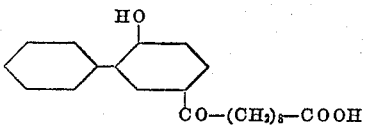

The compounds of this invention are useful as intermediates in the preparation of complex organic molecules such as dye intermediates and steroidal compounds. They are also useful as therapeutic agents. Certain of them are of use as plasticizers, mold inhibitors, antiseptics, fungicides, and as components of insecticides.

The compounds of this invention are prepared by reacting an alkyl ether of a hydroxybiphenyl

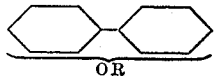

wherein R is alkyl, acyl, or carbalkoxy (e. g., methyl, acetyl or carbethoxy), with an acid anhydride or acid halide of a dibasic aliphatic acid

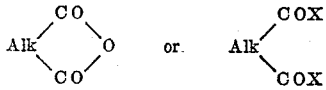

wherein Alk is alkylene and X is halogen, in the presence of a Friedel-Crafts catalyst such as anhydrous aluminum chloride in an inert solvent. The resulting ketoacid has the formula:

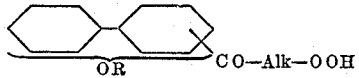

The foregoing compound is subsequently dealkylated, preferably by reaction with boiling concentrated hydriodic acid. Other halogen acids (such as hydrobromic) may be used, or anhydrous aluminum chloride is satisfactory.

The hydroxyxenoylalkanoic acids are soluble in basic solutions and can be converted into water-soluble alkali metal and amine salts. They can be readily esterified and converted into higher polynuclear compounds. Among the salts which are desirable are those made from alkalies and lower water-soluble, non-aromatic amines such as the primary, secondary and tertiary alkylamines and alkanolamines.

Our invention is disclosed in greater detail in the following examples, which are provided for the purpose of illustration and not to define or limit the invention. The amounts are given in parts by weight.

As used in the following examples and claims and in the foregoing discussion, the term "xenoyl" refers to the phenylbenzoyl radical, which has three forms depending upon whether the phenyl radical is linked ortho, meta or para to the carbonyl group of the benzoyl radical. The 4-xenoyl radical has the form

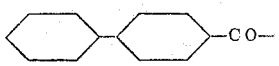

the 3-xenoyl radical is

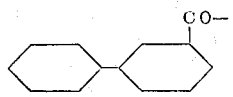

and the 2-xenoyl radical is

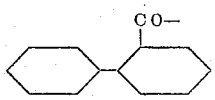

*Example 1*

A. 100 parts of p-methoxybiphenyl and 60 parts of succinic anhydride are dissolved in 1200 parts of nitrobenzene and cooled to 5° centigrade. 146 parts of anhydrous aluminum chloride are added in small portions to the well-cooled reaction mixture, while the temperature is maintained at 4–5° C. The mixture is stirred for about 15 hours, during which time the temperature is allowed to rise to about 20° C. The reaction mixture is decomposed with ice and hydrochloric acid, and the nitrobenzene is removed by steam distillation. The solid residue is taken up in 2500 parts of water containing 125 parts of sodium carbonate. The solution is boiled with decolorizing charcoal, filtered, and the filtrate chilled. The light yellow sodium salt which separates is filtered and washed with water. It is then suspended in 1500 parts of hot water and acidified with dilute hydrochloric acid. The precipitate of $\beta$-(4-methoxy-4'-xenoyl)propionic acid is collected on a filter, washed with water, and dried. It melts, after recrystallization from 50% acetic acid, at 196–198° C.

The mother liquor remaining after removal of the sodium salt is heated to boiling, treated with 600 parts of sodium chloride, and cooled. The sodium salt of $\beta$-(4-methoxy-3-xenoyl)propionic acid separates. This is filtered and dried, then dissolved in 1500 parts of hot water and filtered with decolorizing charcoal. The filtrate is acidified and the acid thus obtained is recrystallized from 50% ethanol. $\beta$-(4-methoxy-3-xenoyl)propionic acid forms pale yellow crystals melting at 149–150° C.

B. 10 parts of $\beta$-(4-methoxy-3-xenoyl)propionic acid and 85 parts of hydriodic acid (specific gravity 1.7) are heated until the evolution of methyl iodide ceases. The reaction mixture is poured into 500 parts of ice and water. The precipitate is taken up in excess dilute sodium carbonate solution, filtered with decolorizing charcoal, and the filtrate acidified with excess hydrochloric acid. $\beta$-(4-hydroxy-3-xenoyl)propionic acid so obtained is recrystallized from 50% acetic acid, and then from 60% methanol, to form long glistening needles melting at 136–137° C.

*Example 2*

30 parts of $\beta$-(4-methoxy-4'-xenoyl)propionic acid (Example 1A) and 200 parts of hydriodic acid (sp. g. 1.7) are heated together until the evolution of methyl iodide ceases (about 15 minutes). The hot reaction mixture is poured into 500 parts of ice and water, and the precipitate is collected on a filter and washed. It is dissolved in about 1000 parts of boiling 15% sodium carbonate solution, treated with decolorizing charcoal, and filtered into an excess of dilute hydrochloric acid. The white solid which separates is removed by filtration, washed with water, and dried. $\beta$-(4-hydroxy-4'-xenoyl)propionic acid (Compound A) is recrystallized from ethanol as small white crystals melting at 218–220° C.

*Example 3*

A. 89 parts of o-methoxybiphenyl and 50 parts of succinic anhydride are dissolved in about 1000 parts of nitrobenzene and cooled to 5° C. 133 parts of anhydrous aluminum chloride are added in small portions over a period of 30 minutes, with stirring, the temperature being kept at 3–5° C. Then the mixture is stirred overnight, during which time it is allowed to rise to room temperature. The reaction mixture is decomposed with ice and hydrochloric acid, and the nitrobenzene is removed by steam distillation. The residue is taken up in 1500 parts of water containing 100 parts of sodium carbonate. The solution is boiled with decolorizing charcoal and filtered. The filtrate is added slowly to an excess of dilute hydrochloric acid. The $\beta$-(2-methoxy-5-xenoyl)propionic acid which precipitates is recrystallized from toluene, and forms very pale yellow crystals of melting point 131–132° C.

B. 5 parts of $\beta$-(2-methoxy-5-xenoyl)propionic acid and 42.5 parts of hydriodic acid (sp. g. 1.7) are refluxed until methyl iodide is no longer evolved. The reaction mixture is poured into 100 parts of ice and water. The white precipitate is removed by filtration and dried. After recrystallization from 50% methanol, $\beta$-(2-hydroxy-5-xenoyl)propionic acid (Compound F) forms small white crystals melting at 169–170° C.

We claim:

1. As a new composition of matter, a hydroxyxenoylalkanoic acid wherein the alkanoic acid portion of said hydroxyxenoylalkanoic acid contains at least 2 and no more than 9 carbon atoms, and salts thereof.

2. A new composition of matter having the formula

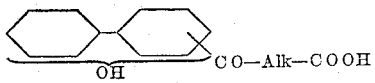

wherein Alk is an alkylene radical containing 2 to 8 carbon atoms, and salts thereof.

3. A new composition of matter having the formula

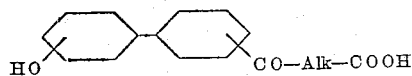

wherein Alk is an alkylene radical containing 2 to 8 carbon atoms, and salts thereof.

4. A new composition of matter having the formula

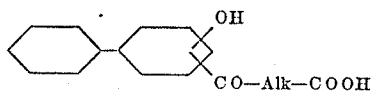

wherein Alk is an alkylene radical containing 2 to 8 carbon atoms, and salts thereof.

5. A new composition of matter having the formula

wherein Alk is an alkylene radical containing 2 to 8 carbon atoms, and salts thereof.

6. A new composition of matter having the formula

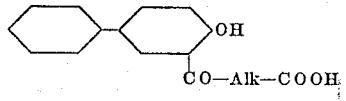

wherein Alk is an alkylene radical containing 2 to 8 carbon atoms, and salts thereof.

7. A new composition of matter having the formula

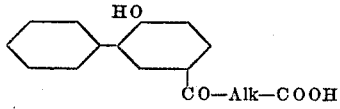

wherein Alk is an alkylene radical containing 2 to 8 carbon atoms, and salts thereof.

8. β - (4 - hydroxy - 4' - xenoyl) propionic acid, having the formula

and salts thereof.

9. β - (4 - hydroxy - 3 - xenoyl) propionic acid, having the formula

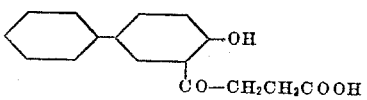

and salts thereof.

10. β - (2 - hydroxy - 5 - xenoyl) propionic acid, having the formula

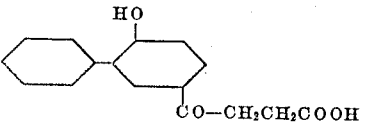

and salts thereof.

ROBERT R. BURTNER.
HARRY A. ARBIT.

REFERENCES CITED

The following references are of record in the file of this patent:

FOREIGN PATENTS

| Number | Country | Date |
|--------|---------|------|
| 798,941 | France | May 29, 1936 |

OTHER REFERENCES

Giua, Gazz. Chim. Italia, vol. 47 (I), pp. 89–92 (1917).

Fieser, J. Am. Chem. Soc., vol. 54, 4347–4354 (1932).

Fieser et al., J. Am. Chem. Soc., vol. 58, pp. 1738–1741 (1938).

Wahl, Compt. Rend. (Fr. Acad. Sci.), vol. 206, pp. 683–685 (1938).

Raval et al., Chem. Abstracts, vol. 33, col. 3779 (1939).

Hey et al., Journ. Chem. Soc. (London) p. 1030 (1940).

Weizmann et al., Chem. and Ind., vol. 59, pp. 402–403 (1940).